March 26, 1940.  G. A. CATHEY  2,194,737
MOTION PICTURE APPARATUS
Filed Oct. 15, 1937   2 Sheets-Sheet 1
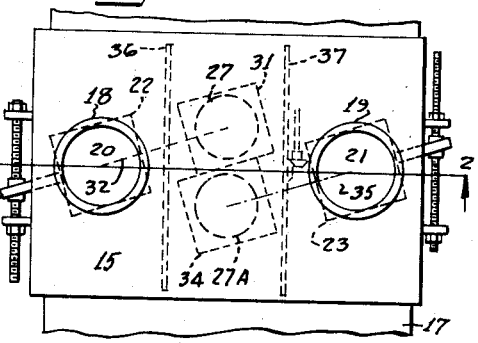
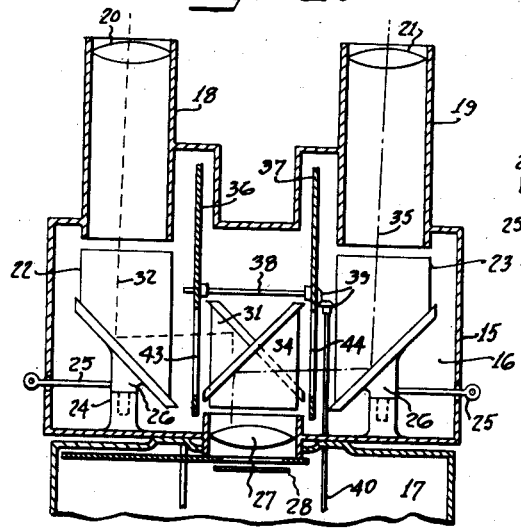
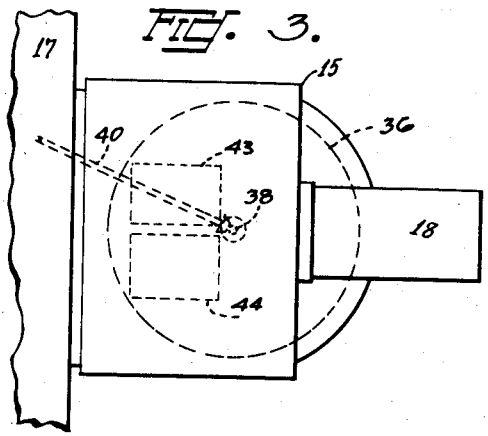
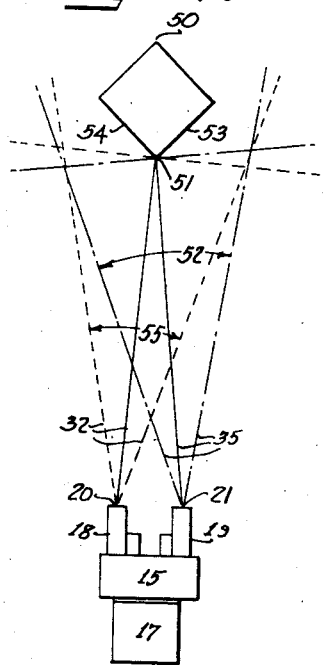
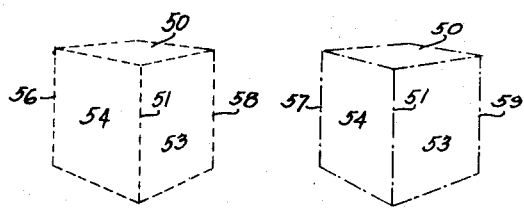
INVENTOR.
G. A. CATHEY
BY
ATTORNEY.

March 26, 1940.  G. A. CATHEY  2,194,737
MOTION PICTURE APPARATUS
Filed Oct. 15, 1937  2 Sheets-Sheet 2
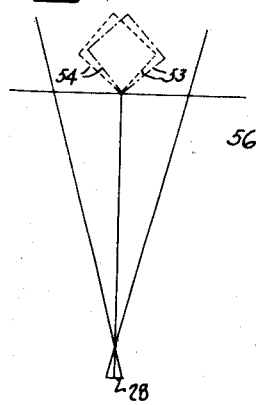
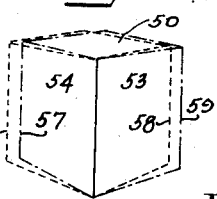
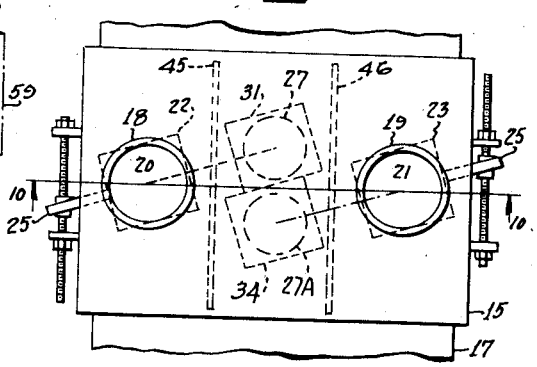
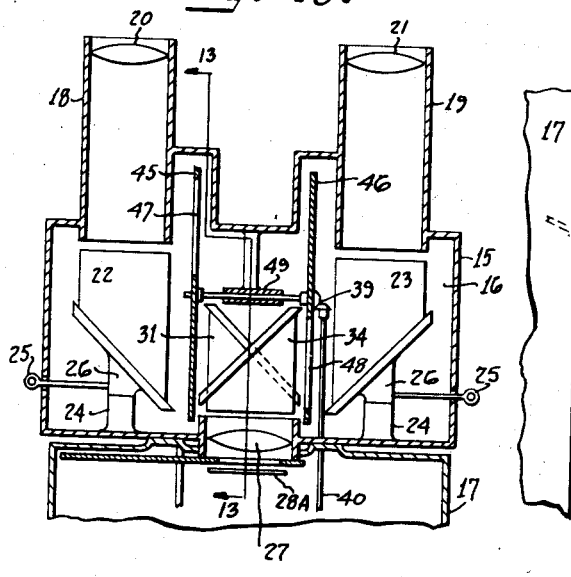
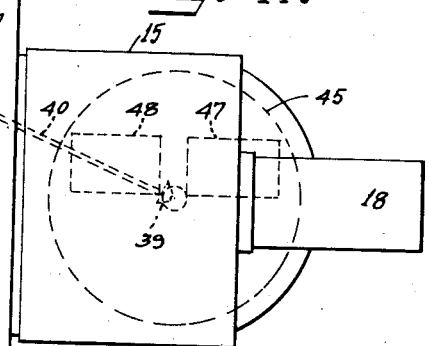
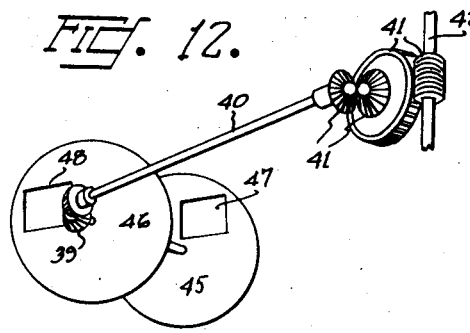
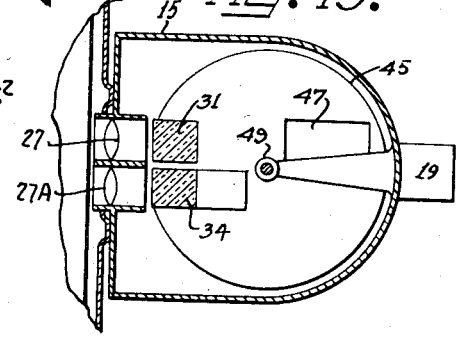
INVENTOR.
G.A. CATHEY
BY
ATTORNEY.

Patented Mar. 26, 1940

2,194,737

UNITED STATES PATENT OFFICE 2,194,737

MOTION PICTURE APPARATUS

George A. Cathey, Portland, Oreg.

Application October 15, 1937, Serial No. 169,166

2 Claims. (Cl. 88—16.6)

This invention relates generally to a motion picture apparatus, and particularly to a special form of motion picture camera for taking three dimension pictures.

The main object of this invention is the provision of a special form of camera for taking three dimension pictures which can be shown by means of an ordinary motion picture projecting machine.

The second object is to accomplish this result by means of an apparatus whose moving parts are merely rotary and in which the image reflecting elements although adjustable are held stationary in order that the accuracy of the picture may not be lessened by any wear which may develop in the moving parts.

The third object is to make possible the production of an improved form of image upon the film and at the same time to permit films exposed in this machine to be used in the ordinary motion picture projecting machine.

I accomplish these and other objects in the manner set forth in the specification following as illustrated in the accompanying drawings, in which:

Fig. 1 is a fragmentary front elevation of my device.

Fig. 2 is a fragmentary section taken along the line 2—2 in Fig. 1.

Fig. 3 is a fragmentary side elevation.

Fig. 4 is a diagrammatic view showing my stereoscopic camera focused on a point and the relative fields of vision of the two lenses thereof.

Fig. 5 is a perspective view in dotted lines showing the appearance of the object when the left eye alone is used to view it.

Fig. 6 is a view similar to Fig. 5 except showing its appearance when the right eye alone is used to observe it.

Fig. 7 is a diagrammatic plan showing the manner in which my alternating stereoscopic pictures are projected upon the screen.

Fig. 8 is a composite view of Figs. 5 and 6 showing the total result of the vision obtained by both of the eyes.

Fig. 9 is a view similar to Fig. 1 showing a modified form of the device.

Fig. 10 is a fragmentary section taken along the line 10—10 in Fig. 9.

Fig. 11 is a fragmentary side elevation of Fig. 9.

Fig. 12 is a fragmentary perspective view showing the manner in which the controlling disks are operated in synchronism with the film operating train.

Fig. 13 is a section taken along the line 13—13 in Fig. 10.

Similar numerals refer to similar parts throughout the several views.

Before entering into an explanation of this invention, it must be understood that various methods have been employed in the production of three dimension pictures. With my apparatus, I employ a combination of a stereoscopic camera with an alternating prismatic attachment for admitting light from the two lenses in alternating succession to the film square area and the only moving means for producing this effect are a pair of revolving disks which operate in synchronism with a film operating train.

Attention is drawn to my co-pending application Serial No. 104,201, filed October 6, 1936, over which the device described herein is an improvement.

Referring in detail to the drawings, there is shown in Figs. 1 to 3 a light tight box 15 forming a compartment 16 which is adjacent to a camera compartment 17. The box 15 is provided with tubular lens holders 18 and 19 which contain the front combination lenses 20 and 21. Associated with the holder 18 and lens 20 is a left hand prism 22 and associated with the holder 19 and lens 21 is a right hand prism 23. The prisms 22 and 23 are pivotally mounted on the pedestals 24 and are adjustable by means of the arms 25 which project from the prism mountings 26.

Between the compartments 16 and 17 are placed the back combination lenses 27 and 27—A in alinement with which is placed the film strip 28. The usual form of shutter 29 is provided having an opening 30 along the axes of the lenses 27 and 27—A.

Associated with the prism 22 is a prism 31 which is adapted to reflect the ray of light 32 passing through the front combination lens 20 through the prism 22 thence through the prism 31 and back combination lens 27 to the film strip 28.

A prism 34 is associated with the prism 23 and a ray of light 35 from the lens 21 passes through the prism 23 then through the prism 34 and the back combination lens 27—A to the film strip 28. It can be seen in Fig. 1 that the prisms 31 and 34 are offset from each other making it possible for the exposure to occur simultaneously from the lenses 27 and 27—A.

To provide the required interruption necessary to permit the movement of the film 28 itself there are provided the disks 36 and 37 which are on a common shaft 38 which is driven through suitable bevel gears 39 from a shaft 40 which is driven through the gears 41 from the shaft 42 of the film operating train (not shown).

The disks 36 and 37 are provided with openings 43 and 44 respectively which are in alinement with their respective prisms so that light passing through the lenses 20 and 21 to the prisms 31 and 34 will be projected from the lenses 27 and 27—A simultaneously producing the desired pair of stereoscopic exposures thereby producing two squares of film at one time.

In the form of the device shown in Figs. 9 to 11 a somewhat different action occurs. In this form of the device which is otherwise identical to the form shown in Figs. 1 to 3 the disks 45 and 46 are provided with apertures 47 and 48 which are out of register with each other. As the disks 45 and 46 revolve in synchronism with the movement of the film strip 28—A, images are projected in an alternate manner upon the film strip 28—A; whereas, in the form of the device shown in Fig. 2, the images are projected simultaneously upon the film strip 28. The two movements, however, are identical in that they both employ fixed simple prisms for projecting stereoscopic views upon the film strips and they differ from each other only in the manner in which the operation is performed.

A suitable bearing 49 is provided for the shaft 38 of the disks 36, 37 and 45 and 46.

The operation of the device is as follows. Assuming that a picture is to be taken of an object 50 and the camera is equipped with my device and focused, for example, on the foremost corner 51, it follows that the intercepted angle 52 of the lens 21 will include more of the side 53 than of the side 54 of the object 50. It also follows that the intercepted angle 55 of the lens 20 will include more of the side 54 than it does of the side 53. Since the lenses 20 and 21 register their pictures simultaneously or in alternating succession, it follows that a motion picture of the square or cube 50 made as shown in Fig. 4 will produce a series of frames on the film strip 28 or 28—A, one set of frames corresponding with the view shown in Fig. 5 and the alternate set corresponding with the view shown in Fig. 6. When these two sets of views are projected upon the screen as shown in Fig. 7, they will be superimposed as shown in Fig. 8, providing an optical illusion of a third dimension due partly to the fact that the portion of the picture in the immediate foreground overlaps and is made visible twice as many times as is the area between the vertical lines 56 and 57 as well as 58 and 59. Not only will this overlapping portion tend to produce this seeming distance but also in a graduated scale by a constant change in the average length between the background and the foreground, there is produced the much desired effect of third dimension or distance. For example, in the simple illustration of the cube, it is apparent that the overlapping portions of the pictures can show a diminished vision; but if, for example, a point in the overlapping portion of the picture were two inches to the left of the main center line of the picture and in the next view it was one and one-half inches to the left by reason of the different points of views from which the pictures are taken, when these pictures are shown upon the screen in rapid succession, they would appear to be actually one and three-quarters inches to the left of the center line.

I claim:

1. In a stereoscopic camera, a casing having a rear wall provided with a pair of relatively spaced and vertically aligned openings, a rear combination lens located in each opening, a pair of reflecting elements arranged in vertical alignment within said casing forward of the rear lenses and having their reflecting surfaces disposed at opposite angles of 45° to the optical axis of the respective rear lenses, a pair of disks rotatably mounted within the casing, said disks having windows formed therein for lateral registry with said reflectors, a second pair of reflecting elements spaced laterally on a horizontal line equally from the optical axis of said rear lenses, the reflecting surfaces of said second pair of reflectors being respectively parallel to the respective reflecting surfaces of the first mentioned pair of reflectors, a second pair of combination lenses positioned forwardly of and having their optical axis respectively aligned with the centers of the second pair of reflectors, and means to rotate said disks.

2. In a stereoscopic camera, a casing having a front provided with a pair of relatively spaced and horizontally aligned openings, a front combination lens arranged in each opening, the rear wall of the casing having a pair of centrally positioned and vertically aligned openings therein, a back combination lens arranged in each rear opening, and a pair of reflecting prisms arranged between each front and back combination lens to transmit the rays from the horizontally aligned front lenses to the vertically aligned rear lenses, one of the reflecting prisms in each pair being pivotally mounted on a horizontal axis to adjust the reflection of the transmitted ray through the rear lenses.

GEORGE A. CATHEY.